Figure 1:
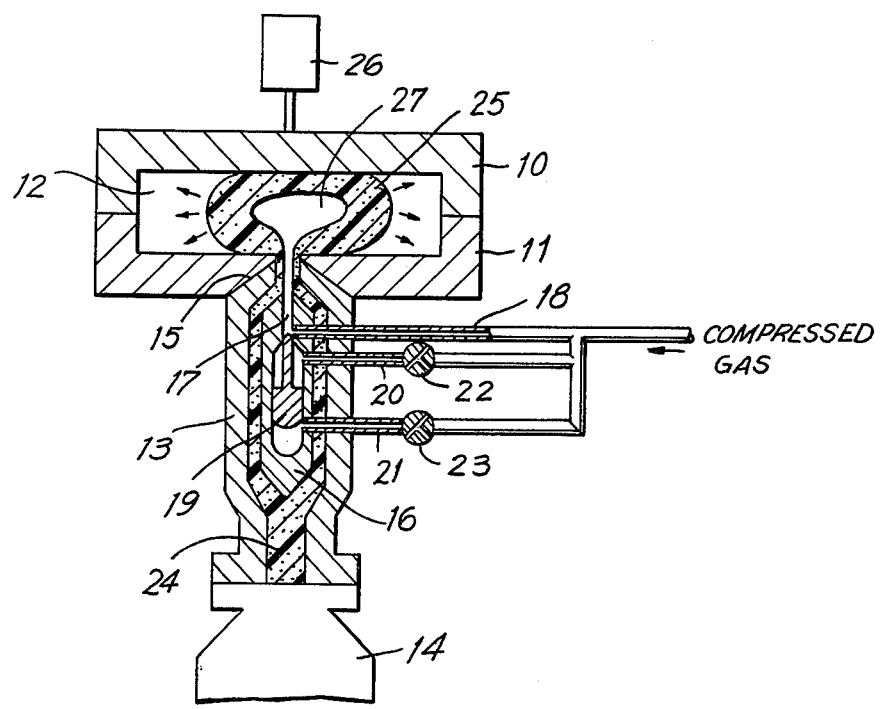

United States Patent [19]
Friederich

[11] 4,101,617
[45] Jul. 18, 1978

[54] METHOD FOR INJECTION MOLDING OF HOLLOW SHAPED BODIES FROM THERMOPLASTIC RESINS

[75] Inventor: Ernst Friederich, Darmstadt, Fed. Rep. of Germany

[73] Assignee: Rohm GmbH, Darmstadt, Fed. Rep. of Germany

[21] Appl. No.: 647,793

[22] Filed: Jan. 9, 1976

[30] Foreign Application Priority Data

Jan. 15, 1975 [DE] Fed. Rep. of Germany ....... 2501314

[51] Int. Cl.² .............................................. B29C 5/06
[52] U.S. Cl. ....................................... 264/93; 264/97; 264/155; 425/533
[58] Field of Search ....................... 264/88, 89, 93, 94, 264/96–98, 45.1, 46.6, 55, DIG. 83, DIG. 1, 154, 155; 425/387.1, 533, 535

[56] References Cited

U.S. PATENT DOCUMENTS

| | | | |
|---|---|---|---|
| 2,331,688 | 10/1943 | Hobson | 264/97 |
| 3,021,559 | 2/1962 | Strong | 264/96 |
| 4,033,710 | 7/1977 | Hanning | 425/543 |

FOREIGN PATENT DOCUMENTS

| | | | |
|---|---|---|---|
| 1,929,343 | 12/1970 | Fed. Rep. of Germany | 425/4 R |
| 2,106,546 | 8/1972 | Fed. Rep. of Germany | 264/88 |

*Primary Examiner*—Jan H. Silbaugh
*Attorney, Agent, or Firm*—Curtis, Morris & Safford

[57] ABSTRACT

A method for making a hollow shaped body from a thermoplastic resin by injection molding, which method comprises injecting an amount of molten resin sufficient for the preparation of the hollow shaped body from an injection nozzle into a mold through an injection aperture in said mold, injecting gas under pressure through said injection nozzle and aperture to expand and distribute the molten resin over the interior surfaces of the mold, whereby said hollow shaped body is formed within said mold with a gas-entry opening in said hollow shaped body, cooling the hollow shaped resin body so formed to a temperature beneath the softening point of the resin, opening the interior of the hollow shaped body to equalize the pressure therein with ambient pressure, and then opening said mold to remove said hollow shaped body.

8 Claims, 3 Drawing Figures

U.S. Patent  July 18, 1978  4,101,617

METHOD FOR INJECTION MOLDING OF HOLLOW SHAPED BODIES FROM THERMOPLASTIC RESINS

The present invention relates to a method for making hollow shaped bodies by a modified injection molding process.

It is known in the art to prepare hollow bodies from thermoplastic resins by adhering or welding together two halves, which halves are usually mirror-symmetric and are formed, for example, by injection molding.

According to so-called "injection blowing" methods, hollow bodies of the type in question are made by preparing a pre-molded object by injection molding, i.e. with the resin in its thermoplastic condition. At this point, the apparatus is opened and the pre-molded object, including its core, is inserted into a second hollow mold suitable for blowing. In this mold, the hollow body is given its final shape by the introduction of gas. This process is widely used, particularly for the preparation of bottles and other relatively small hollow bodies.

The object of the present invention is to prepare hollow bodies of large size, for example double-paned windows, hollow glass bricks, double-walled lighting fixtures of large area, and double-walled skylights, from thermoplastic resins in one step and in a single mold using an injection molding procedure. In this way, the new procedure differs from the injection-blowing technique mentioned above, which latter involves at least two processing steps.

The new method is characterized by the following features, illustrated by reference to the preparation of a hollow "glass brick" of polymethylmethacrylate. The molding material, which has been rendered plastic in the injection cylinder of an automatic injection molding machine, is injected at a temperature of 260° C. into the mold cavity of the apparatus through an injection nozzle. In known fashion, the injection aperture of the mold is suitably located in the middle of the mold surface surrounding the aperture. In general, the total amount of the forming material which is to form the hollow body is injected with one stroke. Immediately after the injection process, or even superimposed on this process, gas is introduced into the mold through the injection aperture under such a pressure that the mold-filling process takes place completely. Air, carbon dioxide, or nitrogen, for example, can be employed as the pressurized gas. In the mold, the desired hollow body is formed and, because of the thermoplasticity of the resin, is held in its final form by gas pressure.

After cooling of the finished hollow body below the softening point of the resin, but before opening the mold, a pressure equalization with the ambient atmosphere is carried out. The pressure within the cooled shaped body can be equalized with ambient pressure simply by separating the mold and the injection nozzle, causing the resin to break around the thin neck of resin surrounding the injection aperture.

Alternatively, an amount of molten forming material sufficient to close the gas entry opening in the shaped body can be injected under pressure into the injection aperture after a sufficient amount of compressed gas has been introduced. In this case, equalization of the pressure in the closed hollow body is effected after cooling by boring into or piercing a wall of the body. It is recommended that this opening be made in the plane along which the mold will be separated, since an opening in this location is in general not visible on later use of the hollow body, for example as a double paned window.

Figure 2:
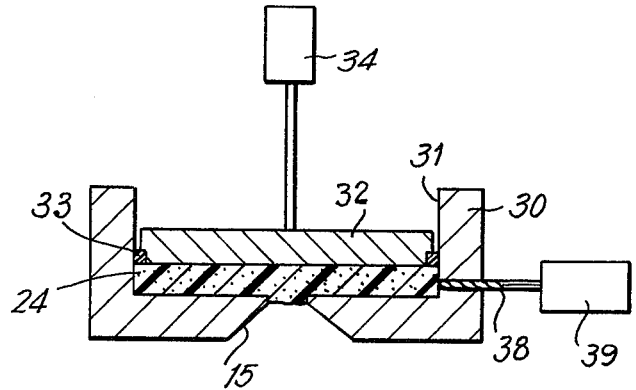
Figure 3:
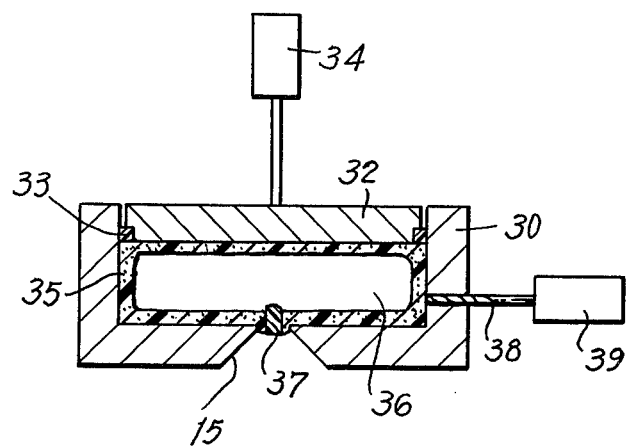

A better understanding of the invention will be had by referring to the accompanying drawings, in which FIG. 1 is a front elevation, partly in section, of an apparatus, including a mold and an injection nozzle, for carrying out the process of the present invention; and FIGS. 2 and 3 are front elevations, partly in section, showing two successive stages in carrying out the method of the present invention employing a mold embodiment having male and female portions.

FIG. 1 shows a mold comprising upper mold portion 10 and lower mold portion 11, both suitably of metal, defining mold cavity 12 therebetween. Mold cavity 12 has a form corresponding to that of the hollow resin body to be produced according to the invention.

Injection nozzle 13, also suitably of metal and attached at one end to outlet 14 of an injection molding machine, is mated with lower mold portion 11 at its other end through injection aperture 15 (better seen in FIGS. 2 and 3 which omit injection nozzle 13). Injection nozzle 13 has therein core portion 16 provided in its interior portions with compressed gas channel 17 in communication through gas inlet tube 18 with a source of compressed gas. Located within channel 17 in core portion 16 of injection nozzle 13 is pressure-activated valve 19. Valve 19 is slidably movable within channel 17 under the action of compressed gas alternately introduced through gas lines 20 and 21 through three-way valves 22 and 23.

At the beginning of the process of the present invention, molten thermoplastic resin 24 is introduced into mold cavity 12 from outlet 14 of an injection molding machine through injection nozzle 13. During the resin injection stage, pressure-activated valve 19 is in a position (not shown in FIG. 1) which blocks gas inlet tube 18. This is achieved by introducing compressed gas through line 21 and valve 23 while permitting gas to escape from the interior of core portion 16 through line 20 and valve 22. After mold cavity 12 is partially filled with resin, gas line 20 is pressurized through valve 22 while gas is bled from the interior of core portion 16 through line 21 and valve 23. This causes valve 19 to assume the position shown in FIG. 1. Gas inlet tube 18 is thus opened, permitting compressed gas to flow therethrough into compressed gas channel 17, in turn in communication with mold cavity 12 through injection aperture 15. In consequence, resin bubble 25 is formed within mold cavity 12. Compressed gas continues to flow through inlet tube 18 causing resin bubble 25 to expand in the direction shown by the arrows until the exterior walls of the bubble are pressed completely against the inner wall of mold cavity 12 defined by upper and lower mold portions 10 and 11. Valve 19 is then again actuated by appropriate manipulation of valves 22 and 23 to introduce gas through line 21 and remove it from line 20, thereby moving valve 19 in compressed gas channel 17 into a position which again blocks the entry of compressed gas through inlet tube 18. As soon as the hollow shaped body thus formed within mold cavity 12 has cooled below the softening temperature of the thermoplastic resin, joined upper and lower mold portions 10 and 11 are separated as a combination from injection nozzle 13 by means 26, for example hydraulic moving means. This movement breaks the thin neck of resin surrounding the walls of injection aperture 15 and the pressurized gas contained within cavity 27 of the hollow shaped body formed within the mold portion escapes to the ambient atmosphere through the opening produced thereby. Upper and lower mold portions 10 and 11 are then separated and the shaped resin body is removed from the separated mold portions.

FIGS. 2 and 3 show two successive stages of carrying out the method of the present invention employing a different mold embodiment comprising female mold portion 30, suitably of metal, having therein shaped depression 31 into which matching male mold portion 32, also suitably of metal, is fitted. Male mold portion 32 and female mold portion 30 are brought into sealing relationship by peripheral sealing gasket 33. Female mold portion 30 contains therein injection aperture 15 which, as for the mold embodiment shown in FIG. 1, is brought into a mating relationship with an injection nozzle such as nozzle 13 shown in FIG. 1. (For purposes of clarity, the injection nozzle has been omitted from FIGS. 2 and 3.)

At the beginning of the resin injection process shown in FIG. 2, thermoplastic resin 24 is introduced into a cavity defined between female mold portion 30 and male mold portion 32. Then, proceeding as described earlier herein with reference to FIG. 1, compressed gas is introduced through an injection nozzle into the molten thermoplastic resin while, simultaneously, male mold portion 32 is moved upwardly by means 34, for example hydraulically operated moving means, connected thereto. In this manner, the resin mass 24 of FIG. 2 is formed into a hollow shaped body (shown as 35 in FIG. 3).

Just as in the process described with reference to FIG. 1, after the resin comprising hollow shaped body 35 has cooled beneath its softening temperature, joined mold portions 30, 32 are separated in combination from the injection nozzle so that pressurized gas contained within cavity 36 of the resultant shaped body can escape and equalization with ambient pressure occurs. On removal of male mold portion 32 completely from shaped depression 31 defined within female mold portion 30, shaped resin body 35 can be removed from the mold.

In addition to the method embodiment specifically described with reference to FIGS. 2 and 3, numerous other embodiments for carrying out the process of the invention are possible. Thus, for example, at the beginning of the resin injection process, the cavity present in mold 30, 32 can be only partially filled with resin. Male mold portion 32 can be moved upwardly even during the injection of resin, although it is more advantageous to effect this movement simultaneously with the injection of compressed gas or even to permit the movement of male mold portion 32 within female mold 30 to be effected solely by means of the forces exerted on male mold portion 32 by the compressed gas introduced into the cavity therebeneath.

In many cases, it is not desired that the shaped body formed according to the process of the invention have an opening therein at the locus of the injection aperture 15 in lower mold portion 11 of FIG. 1 or female mold portion 30 of FIGS. 2 and 3. In this case, the gas entry opening in the final shaped body can be sealed with a resin plug such as resin plug 37 particularly shown in FIG. 3. To form such a resin plug, an amount of molten resin sufficient to form the plug is introduced through the injection nozzle after the injection of compressed gas into the resin body is completed. In this case, the gas within the hollow shaped body (cf. cavity 27 of FIG. 1 or cavity 36 of FIG. 3) remains at superatmospheric pressure. After cooling of the thermoplastic resin beneath its softening point, but before the resultant hollow shaped body can be removed from the mold, the gas pressure therein must be equalized with the ambient pressure to avoid a possible explosion of the hollow body on removal from the mold. As shown in FIGS. 2 and 3, to equalize interior pressure with ambient pressure, an aperture can be drilled within hollow shaped body 35 by drill 38 rotated and propelled forward by means 39. The pressurized gas within the hollow shaped body can thus escape into the atmosphere through the opening so produced. If a sufficiently tough resin body is employed for formation of the hollow shaped body, the body can be pierced with a sharp instrument (not shown), in a manner analogous to that shown in FIGS. 2 and 3, instead of employing drill 26. Suitably, the piercing instrument is formed as a cannula having an interior passage therein so that the pressurized gas can escape directly to the atmosphere through the interior passage.

The boring technique and the analogous piercing technique described immediately above with reference to the mold of FIGS. 2 and 3 can, of course, also be adapted to the mold shown in FIG. 1 by appropriate modification thereof.

As synthetic resins which can be employed according to the foregoing process, polystyrene, polyethylene, polyvinyl chloride, and acetobutyrate can be given as examples, in addition to the polymethylmethacrylate already mentioned.

Hollow bodies having a relatively small separation of the parallel walls thereof from one another, for example of 5 millimeters, can be prepared in any of the above-described manners without effort. However, in the preparation of bodies such as the aforementioned glass bricks, whose principal surfaces may be spaced about 50 mm from one another, it is preferable to use expandable molds like the mold shown in FIGS. 2 and 3.

The hollow bodies prepared according to the process of the present invention have an exterior surface which corresponds to the quality of the surface of the mold cavity in the apparatus. If the required temperature for whichever resin is being used is maintained and other injection requirements are met, the inner surface of the hollow body is shiny. Even in the processing of opalescent materials, the quality of the inner and outer surfaces of the shaped body formed therefrom meets all requirements.

It should also be mentioned that the new process can be carried out on commercially-available machines to the extent that these can be modified in a simple manner to permit the controlled introduction of gas under pressure. In evaluating the new process, it should not remain unmentioned that the process permits the preparation of closed hollow bodies whose interior portions are completely dust-free. In the preparation of hollow bodies by the joining of two halves, freedom from dust can only be achieved with a comparatively great effort.

What is claimed is:

1. A method for making a hollow shaped body from a thermoplastic resin by injection molding, which method comprises injecting an amount of molten resin sufficient for the preparation of the hollow shaped body from an injection nozzle into a mold through an injection aperture in said mold, injecting gas under pressure through said injection nozzle and aperture to expand and distribute the molten resin over the interior surfaces of the mold, whereby said hollow shaped body is formed within said mold with a gas entry opening in said hollow shaped body, cooling the hollow shaped resin body so formed to a temperature beneath the softening point of the resin, separating said mold and said injection nozzle after said resin has cooled beneath its softening point, whereby the interior of said hollow shaped body is opened to the atmosphere through said injection aperture and gas-entry opening to equalize the pressure within said body with ambient pressure, and then opening said mold to remove said hollow shaped body.

2. A method as in claim 1 wherein said mold defines therein a mold cavity of fixed volume having the form of the hollow shaped body to be formed therein, and wherein the molten resin injected into said mold initially only partially fills said mold cavity.

3. A method as in claim 1 wherein said mold comprises a female mold portion and a male mold portion movable within said female mold portion to define therein a mold cavity of variable volume, wherein the molten resin injected into said mold initially fills said mold cavity, and wherein the volume of said mold cavity is increased on injection thereinto of gas under pressure.

4. A method for making a hollow shaped body from a thermoplastic resin by injection molding, which method comprises injecting an amount of molten resin sufficient for the preparation of the hollow shaped body from an injection nozzle into a mold through an injection aperture in said mold, injecting gas under pressure through said injection nozzle and aperture to expand and distribute the molten resin over the interior surfaces of the mold, whereby said hollow shaped body is formed within said mold with a gas entry opening in said hollow shaped body, injecting an amount of resin sufficient to close said gas-entry opening in said hollow shaped body through said injection nozzle into said injection aperture, cooling the hollow shaped resin body so formed to a temperature beneath the softening point of the resin, opening the interior of the hollow shaped body to equalize the pressure therein with ambient pressure, and then opening said mold to remove said hollow shaped body.

5. A method as in claim 4 wherein the interior of the hollow shaped body is opened to the ambient atmosphere after cooling of the resin by boring an aperture in said body.

6. A method as in claim 4 wherein said hollow shaped body is opened to the ambient atmosphere after cooling of the resin by piercing said body.

7. A method as in claim 4 wherein said mold defines therein a mold cavity of fixed volume having the form of the hollow shaped body to be formed therein, and wherein the molten resin injected into said mold initially only partially fills said mold cavity.

8. A method as in claim 4 wherein said mold comprises a female mold portion and a male mold portion movable within said female mold portion to define therein a mold cavity of variable volume, wherein the molten resin injected into said mold initially fills said mold cavity, and wherein the volume of said mold cavity is increased on injection thereinto of gas under pressure.

* * * * *